United States Patent [19]

Coleman et al.

[11] 3,896,354
[45] July 22, 1975

[54] MONOLITHIC CERAMIC CAPACITOR
[75] Inventors: James H. Coleman; Jyh-Shuey Lo, both of Wichita Falls, Tex.
[73] Assignee: Sprague Electric Company, North Adams, Mass.
[22] Filed: July 2, 1974
[21] Appl. No.: 485,187

[52] U.S. Cl. ............... 317/258; 317/256; 317/261
[51] Int. Cl. ............................................. H01g 3/06
[58] Field of Search ........... 317/258, 261, 242, 256

[56] References Cited
UNITED STATES PATENTS
| | | | |
|---|---|---|---|
| 3,496,434 | 2/1970 | Prokopowicz | 317/261 X |
| 3,675,095 | 7/1972 | Zehmann | 317/242 |
| 3,714,530 | 1/1973 | Wells | 317/261 X |

Primary Examiner—E. A. Goldberg
Attorney, Agent, or Firm—Connolly and Hutz

[57] ABSTRACT

In a monolithic ceramic capacitor, a first of any two adjacent electrodes is wider than the second electrode and the second electrode has oppositely disposed coplanar and equally wide extended portions that extend in directions at right angles to the width direction beyond the region of common overlap between the two adjacent electrodes. Thus, any inadvertent or unavoidable misregistration between the electrodes in any direction does not cause a change in the common area of overlap and consequently monolithic capacitors can be manufactured to tight capacity tolerances heretofore unattainable.

5 Claims, 11 Drawing Figures

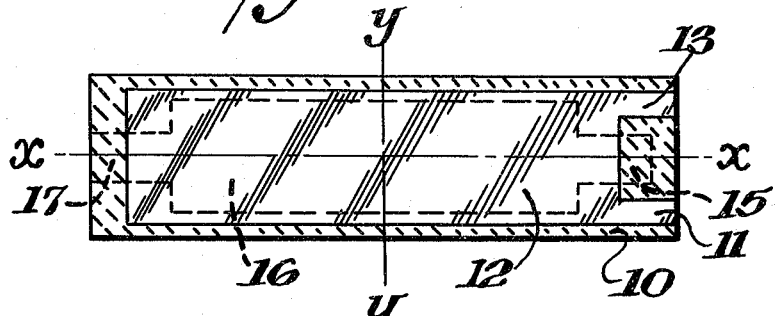
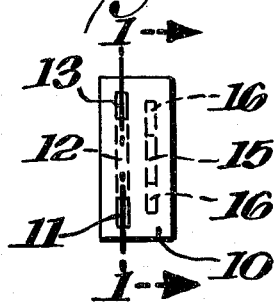
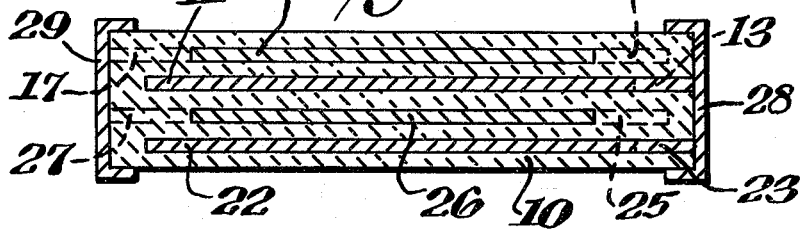
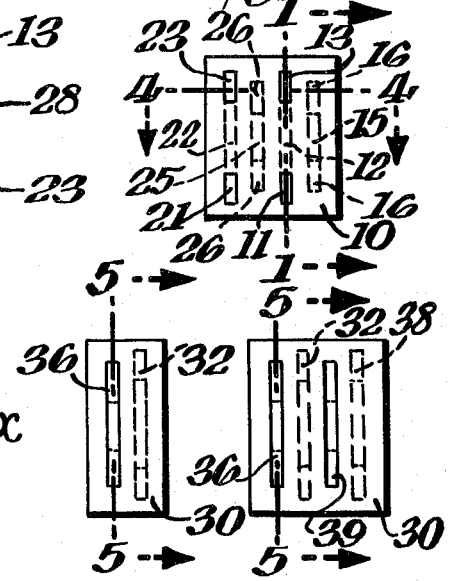
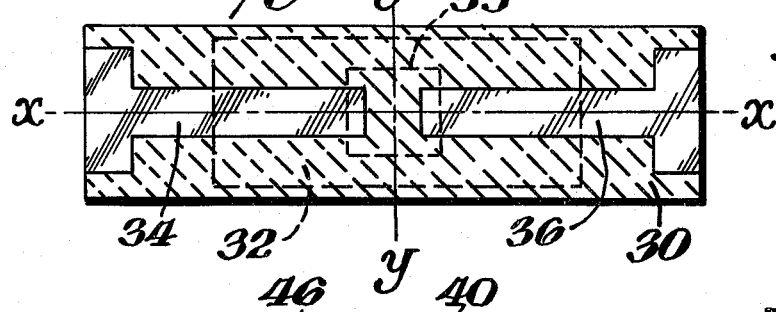
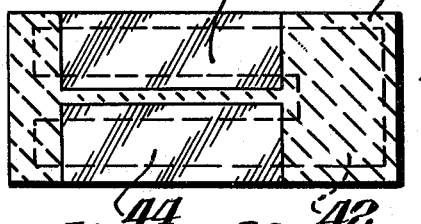
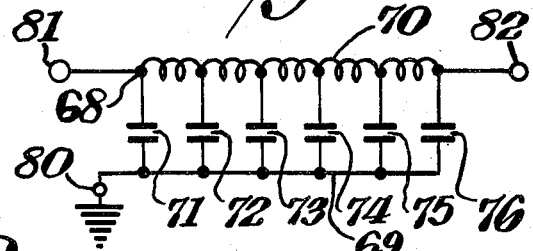
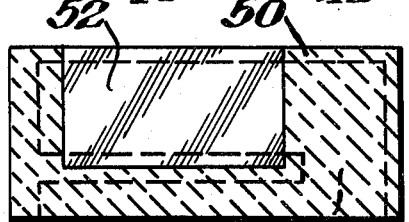
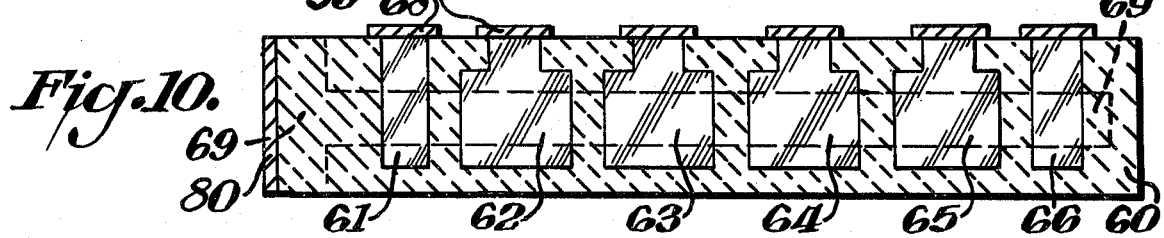

MONOLITHIC CERAMIC CAPACITOR

BACKGROUND OF THE INVENTION

The present invention relates to ceramic dielectric capacitors and more particularly to monlithic ceramic capacitors.

Monolithic ceramic capacitors comprise at least two electrodes buried within a coherent ceramic dielectric body. The electrodes are separated within the body by a layer portion of the ceramic body.

The capacitance of the capacitor is a function of the dielectric constant of the ceramic material, the thickness of the intervening ceramic layer, and the area by which one electrode overlaps another. Monolithic capacitors are typically made by stacking sheets of green ceramic, each sheet having a pattern of metallized film deposited thereon. The stack is then fired to form a sintered and coherent body. Any misregistration or misalignment of the electrodes relative to each other tends to change the area of overlap therebetween and consequently to change the capacitance. Such misregistration of electrodes is typically a major source of deviation of the actual capacitance from the nominal capacitance desired.

It is known to make the width of one electrode less than the width of an adjacent electrode toward reducing the effect of electrode misalignment. However, this only compensates for misregistration in one direction, namely the width direction.

It is therefore an object of the present invention to greatly reduce or eliminate the variations in actual capacitance that are a result of misregistered electrodes of any kind in a monolithic ceramic capacitor.

It is a further object of this invention to provide a monolithic ceramic capacitor of precisely predetermined capacitance value being independent from small variations in the relative alignment of the included electrodes in any direction or orientation.

SUMMARY OF THE INVENTION

A monolithic ceramic capacitor includes at least a first and second electrode buried within a ceramic body. These electrodes are spaced by a layer portion of the dielectric ceramic body and have a common area of overlap that defines an active dielectric region of the ceramic layer. The first electrode is wider than the second so that in nominal relative positions the first electrode extends equally beyond the width dimension of the second electrode and thus beyond the width dimension of the common overlap area. The second electrode has extended length portions at each end that extend beyond the common overlap area. These two length portions are equally wide. Thus, any small misregistration in any direction between relative electrode positions that may have occurred in the manufacturing of the capacitor does not result in a change in the size of the common overlap area; and monolithic capacitors of the present invention may be made to tighter tolerances or capacity values than heretofore possible.

BRIEF DESCRIPTION OF THE DRAWING

FIG. 1 shows a top sectional view of a first and second preferred embodiment of a monolithic ceramic capacitor of this invention taken in a plane 1—1.

FIG. 2 shows an end view of the first preferred embodiment having two electrodes, wherein the plane 1—1 is defined.

FIG. 3 shows an end view of the second preferred embodiment having four electrodes, wherein plane 1—1 is defined.

FIG. 4 shows a side sectional view of the second preferred embodiment taken in a plane 4—4 as defined in FIG. 3.

FIG. 5 shows a top sectional view of a third and fourth preferred embodiment taken in a plane 5—5.

FIG. 6 shows an end view of the third preferred embodiment having one floating electrode, wherein the plane 5—5 is defined.

FIG. 7 shows an end view of the fourth preferred embodiment having two floating electrodes, wherein the plane 5—5 is defined.

FIG. 8 shows a variation in geometry of the electrodes applicable to the third and fourth preferred embodiments.

FIG. 9 shows a variation in geometry of the electrodes applicable to the first and second preferred embodiments.

FIG. 10 shows a top sectional view of a multiple monolithic capacitor of this invention.

FIG. 11 shows a delay line circuit using the capacitor of FIG. 10.

DESCRIPTION OF THE PREFERRED EMBODIMENT

A first preferred embodiment of the present invention, as illustrated in FIGS. 1 and 2, includes a dielectric ceramic body 10 having a planar electrode 12 buried therein. Electrode 12 lies in a plane 1—1 as defined in the end view of FIG. 2. FIG. 1 is the sectional view taken in plane 1—1 showing an exposed view of electrode 12.

Another electrode 16 is shown by dotted lines in FIG. 1, being buried in the ceramic body 10 and lying in another plane underneath electrode 12. The end view of electrode 16 is shown in FIG. 2, being parallel with and spaced from electrode 12. The two planar electrodes are thus separated by a spaced layer of ceramic dielectric material. Referring again to FIG. 1, it can be seen that electrode 12 is wider than electrode 16 and they are so registered with respect to each other that electrode 12 extends on both sides (up and down in X axis directions as shown) beyond the common region of overlap that exists between the two electrodes.

Electrode 16 is also seen as having coplanar extensions 15 and 17, that project from opposite ends of electrode 16. These extensions are equally wide, and less wide than the main portion of electrode 16. Considering the normal or nominal relative position of the two electrodes 12 and 16 as shown in FIG. 1, the above mentioned common region of overlap that exists between the two electrodes 12 and 16 includes an inner portion of extension 15 and an inner portion of extension 17. Outer portions of the two extensions project in Y axis directions beyond the common region of overlap, extension 17 terminating at the outer end surface of the ceramic body 10 and being externally accessible for making electrical connection thereto. Extension 15 on the other end does not reach the outer surface of the body 10. Non-overlapping portions 11 and 13 of electrode 16 do extend to the body surface (at the right hand side as seen in FIG. 1), and become accessible for making electrical connections thereto.

An end view of a second preferred embodiment is shown in FIG. 3 having four electrodes. FIG. 1 also represents the top sectional view of the second preferred embodiment as taken in the plane 1—1 defined in FIG. 3. Electrodes 22 and 26 have the same geometry as electrodes 12 and 16, respectively, and are positioned within the body 10 such that any two adjacent electrodes bear the same spacial relationship as for the first preferred embodiment described above and illustrated in FIGS. 1 and 2. Electrode extensions 11, 13, 21 and 23 all extend to one body surface (the surface seen in end view of FIG. 3) and are therefore accessible for making common electrical connection thereto as shown in FIG. 4, namely by metallized terminal 28.

Likewise at the opposite surface (left hand side as seen in FIG. 4) extensions 17 and 27 are accessible for making common electrical connection thereto, as by metallized terminal 29. Thus when a voltage is applied to terminals 28 and 29 the adjacent electrodes are oppositely polarized and a layer portion of the dielectric ceramic body 10 that separates the adjacent electrodes in the region of overlap therebetween becomes an active dielectric region of the capacitor.

The steps for making the monolithic capacitor of this invention may be any of the various well known methods for making a sheet or a tape of green ceramic particles held together by an organic binder; depositing a film of metal in a predetermined pattern on a surface of the tape, laying a second green ceramic tape over the metallized surface of the first tape; again depositing a film of metal in a predetermined pattern on the surface of the second tape, repeating the above steps as desired; laying an unmetallized layer of tape over the stack and firing the completed stack to drive off organic binders and any vehicles and form a sintered coherent capacitor body. This body is typically cut or broken into pieces each of which comprises an individual capacitor having alternate electrodes exposed at opposite body surfaces for making electrical connection to the capacitor as in FIG. 4. Such connections are made by metallizing these opposite end surfaces and thus making each of the two alternate sets of electrodes electrically common.

The steps of depositing a metal film on a surface of a green ceramic tape is normally accomplished by screen printing a paste made of finely divided metal particles such as a platinum being dispersed in an inert liquid vehicle such as methyl alcohol. The masked screen is typically supported by a frame, the paste is dispensed onto the screen and pressed through the openings in the mask onto the surface of a green ceramic tape by a wiper or squeegee. The wiper distends the screen and always causes some stretching in all directions. When a plurality of electrodes are being simultaneously screened, as is usually the case, screen stretching causes misregistration that grows worse as the distance increases from the point of best registration in the screen. Also the registration of the first underlying electrode pattern with the screen in a successive electrode depositing step, can itself be held only within a discrete tolerance. For these and other reasons relating to the registration of successive electrode patterns in a monolithic capacitor, resulting capacitance variations may be as large as ± 15 percent. However, a monolithic capacitor made according to the principles of the present invention as illustrated by the four embodiments described herein does not exhibit varying capacity from piece to piece as a result of the rotational or lateral misregistration of successive electrode patterns that normally occurs in manufacturing processes currently employed and known in the industry.

Although only as many as four electrodes have been shown used in a capacitors of this invention, it should be understood that any number of alternately polarizable electrodes could be employed.

A third preferred embodiment of the present invention is illustrated in FIGS. 5 and 6. A dielectric ceramic body 30 has a planar electrode 32 buried therein. Second and third planar electrodes lie in a plane 5—5 as defined in the end view of FIG. 6. FIG. 5 is the sectional view taken in plane 5—5 showing an exposed view of the second electrode 34 and the third electrode 36. The pattern and relative position of the first electrode 32 is shown lying underneath the second and third electrodes by broken lines in FIG. 5. A window formed in the central portion of electrode 32 is indicated by broken line 33 in FIG. 5. The first electrode 32 is seen in FIG. 6 spaced from electrodes 34 and 36 by a layer portion of the dielectric body 30.

Inward portions of electrodes 34 and 36 extend beyond the common areas of overlap into the body region corresponding (in FIG. 5) with the window in electrode 32. Outward portions of electrodes 34 and 36 extend beyond the common areas of overlap. With respect to the X and Y axes of the capacitor shown in FIG. 5, all of the above mentioned extended portions of electrodes 34 and 36 extend therefrom along an X direction. The widths of the extended portions of each of electrodes 34 and 36 are made essentially equal such that a relative misalignment from the nominal positions shown between electrode 32 and the other electrodes 34 and 36 will cause no change in the size of the common areas of overlap, and consequently no change in capacity value. Similarly a relative shift between electrodes in the Y direction will also result in no change in the common areas of overlap, since electrode 32 is wider than electrodes 34 and 36 in the vicinity of their regions of common overlap.

An end view of a fourth preferred embodiment is shown in FIG. 7 having four electrodes. FIG. 5 represents the top sectional view of the fourth preferred embodiment taken in plane 5—5 as defined in FIG. 7. Electrodes 38 and 39 have the same geometry as electrodes 32 and 36, respectively, and are positioned within the body 30 such that any two adjacent electrodes bear the same spacial relationship as for the first preferred embodiment described above and illustrated in FIGS. 5 and 6.

In the third and fourth preferred embodiments, electrodes 32 and 38 serve as floating electrodes and are not extended to a body surface. Each shares a common area of overlap with at least two other electrodes that are separately extended to opposite surfaces of the body, as for example electrodes 34 and 36. In effect two series connected capacitors are formed, each of which has a capacitance that is invariant with normal amounts of misregistration therebetween.

A variation in the geometry of the third and fourth embodiments is shown in a sectional top view of FIG. 8. A buried electrode 42 whose profile is shown by dotted lines has a U shape. The center slot in the U shaped electrode serves as a window similar to the window 33 in buried electrode 32 of FIG. 5. Adjacent to and spaced upward from electrode 42 are two co-planar electrodes 44 and 46 that extend to and are exposed at the broad top and bottom faces of the body 40 so that electrical access is had thereto. Electrodes 44 and 46 extend into the window region of electrode 42. These extensions of electrode 44 are equally wide as are those of electrode 46. This configuration is especially useful when very small capacitors are being made and it is desirable to expose substantial portions of the externally connecting electrodes (e.g. 44 and 46) on the broadest body faces.

Similarly, when more substantial exposure of the electrodes is desired in the capacitors of the type described in the first and second embodiments, a variation in geometry is readily made as shown in FIG. 9. Here, the buried electrode 56 extends from the common region of overlap with adjacent electrode 52, so as to be exposed broadly at the long bottom face of the body 50. The electrode 52 is broadly exposed at the top body face. As in the other electrode geometries encompassed by this invention, it is essential that the extensions of an electrode in one axis direction beyond the region of overlap have an accumulated width substantially equal to the accumulated width of extensions in the opposite direction.

It should be understood that many variations in electrode geometry beyond the particular exemplary shapes described herein, may be made according to the principles and within the scope of this invention. For example, in addition to the single stack or set of partially overlapping electrodes, it may be desirable that a ceramic body contain buried therein a number of such stacks. Thus such a capacitor wherein each stack is made according to the principles of this invention, would represent a single ceramic body containing a plurality of capacitors. The ratio of capacitance values of any two such capacitor stacks would always be only a direct function of the particular geometry of the screens used for depositing the electrodes. Such a multiple capacitor would make possible a very small multiple monolithic capacitor assembly for combination with inductors in a delay line circuit, wherein close tolerance capacitors are a necessity.

In FIG. 10 there is shown such a multiple monolithic ceramic capacitor in top sectional view. The buried electrodes 61, 62, 63, 64, 65 and 66 are shown lying in a common plane and each overlaps an underlying adjacent electrode 69. The ceramic body 60 may contain many more strata of electrodes underlying those shown such that alternate electrodes including and under for example electrode 61 all have the same geometry and all are accessible at a common area of the body surface (upper edge as shown) for electrical contact to a metal terminal 68.

The multiple capacitor of FIG. 10 is shown in diagrammatic form connected to a tapped inductor 70 so as to form a delay line circuit as shown in FIG. 11. Capacitors 71–76 have corresponding electrodes 61–66, respectively, with alternate common electrodes 61–66, respectively, with alternate common electrodes (e.g. 69) connected to terminal 80. An electrical input signal at terminals 81–80 is delayed as seen at terminals 82–80.

What is claimed is:

1. A monolithic ceramic capacitor comprising a dielectric ceramic body; a plurality of spaced mutually parallel film electrodes buried in said body, mutually perpendicular X and Y axes of said capacitor defining a plane being parallel to said electrodes, at least one of said electrodes having a common area of overlap with the adjacent of said spaced electrodes, said at least one electrode having co-planar extensions in opposite X axis directions beyond said common overlap area, said extensions in one X axis direction having an accumulated width in the y direction equal to the accumulated width of said opposite X axis extensions, each said adjacent electrode having co-planar extensions in opposite Y axis directions beyond said common overlap area, said extensions of said each adjacent electrode in one Y axis direction having an accumulated length in the x direction equal to the accumulated length of said opposite Y axis extensions; and a connective means at spaced faces of said body for the purpose of connecting a voltage between said at least one electrode and said adjacent electrodes.

2. The capacitor of claim 1 wherein one of said co-planar extensions of each said adjacent electrode extends to one outer face of said ceramic body, and wherein at least one extended portion of said at least one electrode extends to the opposite outer face of said body.

3. The capacitor of claim 2 wherein said connective means comprises said one co-planar electrode extension being contacted by a metallized film being bonded to said one outer face and said extended portion of said at least one electrode is contacted by another metallized film being bonded to said opposite outer face.

4. A monolithic ceramic capacitor comprising a dielectric ceramic body; a first electrode being buried within said body in a first plane and having a window formed in a central portion thereof; a second and third electrode being buried within said body, being spaced along the longitudinal axis of said body and lying in a second plane, said second and third electrodes being separated from said first electrode by a layer portion of said dielectric ceramic body, each of said second and third electrodes having a common area of overlap with respect to said first electrode, said second and third electrodes having inward extended portions projecting beyond said common area of overlap, respectively, into a region corresponding to said window, said second and third electrodes having outward extended portions projecting beyond said common areas of overlap, respectively, said outward extended portions being further extended to opposite surfaces of said ceramic body, respectively, and being capable of having electrical connections made thereto, said outward and inward extended portions of each of said second and third electrodes having equal widths as measured at right angles to said longitudinal axis, such that minor variations in the position of said first electrode in said first plane relative to the positions of said second and third electrodes will not result in a change in the sizes of said areas of overlap.

5. A multiple monolithic ceramic capacitor comprising: a dielectric ceramic body; a plurality of sets of film electrodes buried within said ceramic body, mutually perpendicular X and Y axes of said capacitor defining a plane, said plane and said electrodes being mutually parallel, each said set of electrodes comprising at least a first and second spaced electrode having a common area of overlap, said first electrode having co-planar extensions in opposite X axis directions beyond said common overlap area, said extensions in one X axis direction having an accumulated width in the y direction equal to the accumulated width of said opposite X axis extensions, said second electrode having co-planar extensions in opposite Y axis directions beyond said common overlap area, said extensions of said second electrode in one Y axis direction having an accumulated length in the x direction equal to the accumulated length of said opposite Y axis extensions, said first electrodes of said sets being a common metal film that projects to a surface region of said body in order to be electrically accessible, said second electrodes of said sets each projecting to other separate surface regions of said body in order to be individually electrically accessible, so that a plurality of capacitors are formed within said ceramic body having a common electrode.

* * * * *